US008386427B2

(12) United States Patent
Collet et al.

(10) Patent No.: US 8,386,427 B2
(45) Date of Patent: Feb. 26, 2013

(54) MONITORING BOOKMARKED WEB PAGES

(75) Inventors: Jean-Luc Collet, La Gaude (FR);
Francois-Xavier Drouet, La Gaude (FR); Corrine S. Fresko, London (GB); Carole Truntschka, Saint-Laurent-du-Var (FR)

(73) Assignee: International Business Machines Corporation, Armonk, NY (US)

( * ) Notice: Subject to any disclaimer, the term of this patent is extended or adjusted under 35 U.S.C. 154(b) by 799 days.

(21) Appl. No.: 12/234,874

(22) Filed: Sep. 22, 2008

(65) Prior Publication Data

US 2009/0112821 A1 Apr. 30, 2009

(30) Foreign Application Priority Data

Oct. 26, 2007 (EP) ..................................... 07301499

(51) Int. Cl.
*G06F 17/30* (2006.01)

(52) U.S. Cl. ........ 707/634; 707/623; 707/706; 707/707; 707/708; 707/709; 707/710; 707/705; 709/203; 709/224; 715/206; 715/252; 715/838

(58) Field of Classification Search .................. 707/623, 707/705–710, 634; 709/203, 224; 715/206, 715/252, 838
See application file for complete search history.

(56) References Cited

U.S. PATENT DOCUMENTS

| 6,208,995 | B1 * | 3/2001 | Himmel et al. ........................ 1/1 |
| 6,223,178 | B1 * | 4/2001 | Himmel et al. ........................ 1/1 |
| 7,324,997 | B2 * | 1/2008 | Yamada ................................ 1/1 |
| 7,400,623 | B2 * | 7/2008 | Chen ............................. 370/389 |
| 7,523,096 | B2 * | 4/2009 | Badros et al. ................. 705/7.29 |
| 7,747,937 | B2 * | 6/2010 | Rojer .............................. 715/206 |
| 8,015,170 | B2 * | 9/2011 | Badros et al. ................. 707/706 |
| 8,166,017 | B2 * | 4/2012 | Badros et al. ................. 707/706 |
| 8,234,592 | B2 * | 7/2012 | White et al. ................... 715/838 |
| 2003/0005041 | A1 * | 1/2003 | Ullmann et al. .............. 709/203 |
| 2003/0046290 | A1 * | 3/2003 | Yamada ........................... 707/10 |
| 2003/0225614 | A1 * | 12/2003 | Rodriguez et al. .............. 705/14 |
| 2005/0031303 | A1 * | 2/2005 | Park ................................. 386/69 |
| 2006/0274739 | A1 * | 12/2006 | Chen ............................. 370/389 |
| 2007/0043745 | A1 * | 2/2007 | Rojer ............................. 707/100 |
| 2007/0078903 | A1 * | 4/2007 | Saito ............................. 707/200 |
| 2007/0244903 | A1 * | 10/2007 | Ratliff et al. .................... 707/10 |
| 2007/0282802 | A1 * | 12/2007 | Wilhelm ........................... 707/3 |
| 2008/0141120 | A1 * | 6/2008 | White et al. ................... 715/252 |
| 2008/0232295 | A1 * | 9/2008 | Kreiner et al. ................. 370/313 |
| 2008/0263049 | A1 * | 10/2008 | Hind et al. ....................... 707/10 |
| 2008/0288492 | A1 * | 11/2008 | Gemmell et al. .................. 707/7 |
| 2008/0320168 | A1 * | 12/2008 | Da Palma et al. ............. 709/246 |
| 2009/0112703 | A1 * | 4/2009 | Brown ............................. 705/10 |
| 2009/0112821 | A1 * | 4/2009 | Collet et al. ...................... 707/3 |
| 2010/0241704 | A1 * | 9/2010 | Ahn et al. ..................... 709/203 |

* cited by examiner

*Primary Examiner* — Frantz Coby
(74) *Attorney, Agent, or Firm* — Douglas A. Lashmit; Hoffman Warnick LLC

(57) ABSTRACT

The present invention relates to a method for monitoring a bookmarked web page and a system and a computer program implementing such a method. A method according to an embodiment of the invention includes a first phase, including steps for storing, in association with each other, user identification data and an active version of the web page. The method further includes at least one iteration of a second phase, including a step for sending from user's browser to a network server a request for change information about the bookmarked web page since the stored version was active. On response of the server, if the web page has changed, the user has the possibility to choose to keep the stored old version of the web page or to accept the current version of the web page. The network server may be a server associated with the web page, e.g., a web site server, or an ISP server.

16 Claims, 4 Drawing Sheets

MONITORING BOOKMARKED WEB PAGES

FIELD OF THE INVENTION

The present invention relates to the field of web browser favorite service management. More precisely, the present invention pertains to a method, system and computer program for monitoring web pages bookmarked by a user in a web browser.

BACKGROUND OF THE INVENTION

All browsers now include a "favorite" service which stores a list comprising the Uniform Resource Locator (URL) of the user's favorite web pages. However, the content or the URL of the web pages could be changed or updated as time goes by and there is a need to monitor the changes related to a bookmarked web page.

The work that has been done to monitor the changes or updates in web pages is oriented toward methods and systems comprising a tool which allows a user to monitor his/her favorite web sites by notifying the user if new content is found in these web sites.

There are also known methods and systems, such as those described in US patent application US 2003/0005041, to store in a centralized server a historical sequence of the monitored bookmarked web page and previous versions of a monitored bookmarked web page. These methods allows a user to select one of the previous versions of a bookmarked web page or document.

Nevertheless, the known methods, systems and apparatus are very resource consuming. Indeed, in these systems a centralized server is needed to poll all the web servers associated with the bookmarked web pages and to inform the users' browsers of any change within the bookmarked web pages. When there are a large number of bookmarked web pages then the resources needed by the centralized server to poll all the web pages are very substantial. So the known methods, systems and apparatus become more and more resource consuming with the increase of users and the number of bookmarked web pages.

SUMMARY OF THE INVENTION

The present invention provides a resource efficient method, and a system and computer program implementing the method, for monitoring a bookmarked web page and for informing users about changes related to their bookmarked web pages.

A first aspect of the present invention is directed to a method for monitoring a web page bookmarked by a user in a browser, comprising, in a first occurrence or phase: sending, from the browser to at least one remote network server, identification data for the user, storing by the remote server the identification data in association with the bookmarked web page in a storage means, and in a future occurrence or phase, at least one iteration of: sending, from the browser of the user to the remote network server, a request for change information about the bookmarked web page, and sending, from the remote server to the browser of the user, change information about the web page.

According to the invention, the change information is sent to the user in response to a request from the user. The server stores the user identification data in relation to the bookmarked web page and waits for the browser of the user to request change information about the bookmarked web page. When the server receives a request for change information about the web page, it sends change information about the web page. The method according to the invention requires fewer resources compared to the methods of the prior art where a centralized server polls all the bookmarked web pages.

The change information may comprise information related to the content of the web page, the URL of the web page, or other information related to the web page. Advantageously, the first occurrence may further comprise storing the first occurrence version of the bookmarked version of the web page. By "first occurrence version", or old version, it is meant the version of the web page when the first occurrence is executed.

According to the invention, the bookmarked web page may be set "read only" to detect any modification of the web page. A backup the web page may thus be triggered as soon as a software process tries to access the web page, especially to modify or delete this web page.

In the case of change within the bookmarked web page since first occurrence, the future occurrence may further comprise selecting, by the user, an operation among the following operations: downloading the first occurrence version of the bookmarked web page; downloading a new URL for the bookmarked web page, in case of change within the URL of the web page; downloading the URL of the old version, i.e., the first occurrence version, of the bookmarked web page; or accepting the current version of the bookmarked web page. The operation may be chosen by the user or may be predetermined.

If a selected operation is downloading the first occurrence version, i.e., keeping the version of the web page that was active when the first occurrence was executed, the second occurrence may further comprise: sending a request for downloading the stored version of the bookmarked page, i.e., the first occurrence version of the bookmarked web page; and/or downloading, directly or indirectly, the first occurrence version of the bookmarked web page from the storage means. The storage means may be provided inside the network server, and/or local or distant storage means connected to the network server, possibly thorough a network.

The second occurrence may further comprise deleting the first occurrence version of the bookmarked web page, after the selected operation is executed. If the selected operation is keeping the first occurrence version of the bookmarked web page, then the version is deleted after it has been downloaded by the user. If the selected operation is accepting the current version of the web page, then the first occurrence version is deleted without downloading it.

In an embodiment, the remote network server is a server associated with the bookmarked web page such as a web site server. In this embodiment, the server associated with each web page bookmarked by a user comprises storage means (or is connected to storage means) where the first occurrence version of the web page is stored, possibly in association with the user identification data. Each server receives a request from the user's browser for change information and/or for downloading the first occurrence version of the bookmarked web page.

In another embodiment the remote network server carries out the method for a plurality of web site servers. In this embodiment, the network server may comprise an Internet Service Provider server. The user identification data and the first occurrence version of the bookmarked web page are stored in storage means in this server (or in storage means connected to this server). Request for change information and/or request for downloading the first occurrence version is (are) sent from the user browser to this server.

In a first option of the present invention, the first occurrence may be executed automatically when the user bookmarks the web page. In another option, possibly combined with the first option, the second occurrence may be executed every time the user launches the browser or displays the bookmarked web page. In still another option, possibly combined with the first version, the second occurrence may be executed at a predetermined frequency by the user browser. This predetermined frequency may be chosen by the user and may be for example every day, every other day, every week, etc.

The method according to the invention may be carried out for monitoring the web page for several users. In this case, the storing of identification data may further comprise storing, for at least one bookmarked web page, the identification data for each user bookmarking the web page in a table, the user identification data table, associated with the bookmarked web page.

In case of several users having bookmarked the same web page with the same first occurrence version, the method according the invention may comprise: in the first occurrence, storing the first occurrence version of the bookmarked web page in association with user identification data of each of the several users; and after the second occurrence, deleting the stored bookmarked web page if the second occurrence has been executed for each of the several users and there is a change within the web page since first occurrence.

The method according to the invention may further comprise the storage of the current version of the bookmarked web page in association with the identification data of the users who accept the current version of the web page.

The invention also provides a system comprising computer means adapted for implementing the method according to the invention. The invention further provides a computer program comprising instructions for carrying out the steps of the method according to the invention.

BRIEF DESCRIPTION OF THE DRAWINGS

The new and inventive features believed characteristics of the invention are set forth in the appended claims. The invention itself, however, will best be understood by reference to the following detailed description of an illustrative detailed embodiment when read in conjunction with the accompanying drawings.

DETAILED DESCRIPTION OF THE INVENTION

In the following specifications, elements common to several figures are referenced through a common identifier.

Figure 1:
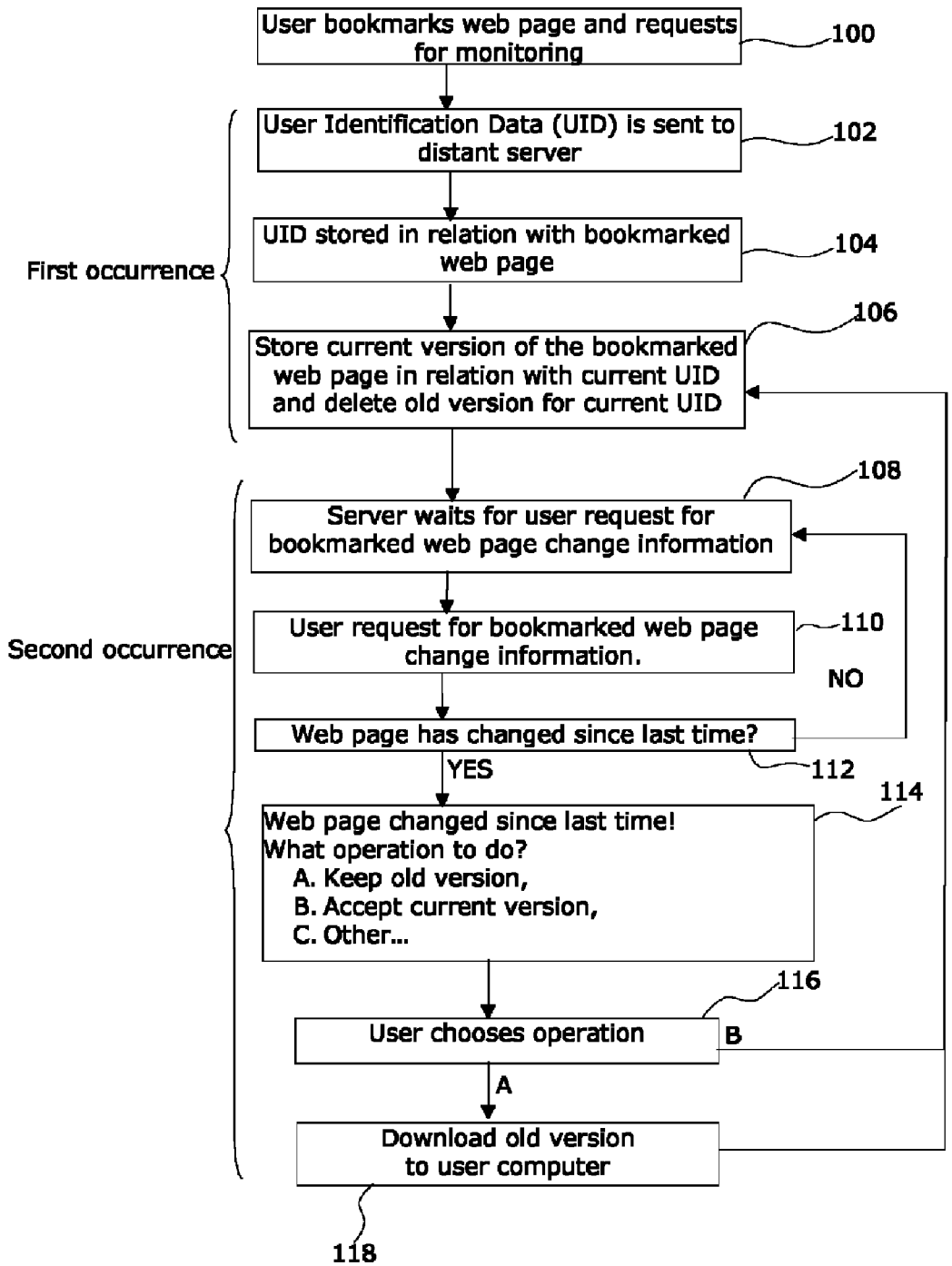
FIG. 1 schematically illustrates the progress of a process for monitoring a bookmarked web page according to the invention.

FIG. 1 illustrates the progress of a process for monitoring a bookmarked web page according to the invention. A monitoring of a web page starts when a user bookmarks the web page at step 100. Typically this monitoring of the bookmarked web page may start, on request of the user, after the page is bookmarked by the user. The bookmarking of the web page and the request for monitoring can also be done in two separate steps.

A user identification data (UID) is sent to the distant network server at step 102.

At step 104, this UID is stored in server side storage means associated with the bookmarked web page. The user UID may be an IP number when the user has a fixed IP number, any identifier chosen by the user such as an e-mail, a nickname, or an identifier given to the user by the distant network server. It can be any combination of letters and/or numbers.

At step 106, the current version of the bookmarked web page is stored in server side storage means.

At step 108, the server waits for a user request for change information about the bookmarked web page.

At step 110 the user, i.e., the browser of the user, sends a request to the server for change information pertaining to the bookmarked web page.

The network server determines, at step 112, if there is a change within the bookmarked web page, since the UID was stored. Still at step 112, the server sends to the user, i.e., to the browser of the user, data representing the change information related to the bookmarked web page. In the present example represented in FIG. 1, the server notifies the user's browser whether the bookmarked web page has changed or not.

If there is no change to the bookmarked web page then the process goes back to step 108 and the network server waits for user's next request for change information about the bookmarked web page.

If there is a change within the bookmarked web page, then the server proposes to the user several operations at step 114: keep the old version of the bookmarked web page, i.e., the version stored at step 106; accept the new version, i.e., the current version of the bookmarked web page at the time the request for change information is sent to the server; or other operations such as: download new URL of the bookmarked web page; redirect the user's browser to the new URL of the bookmarked web page; display new version of the bookmarked web page before choosing any operation, etc. The user chooses the operation at step 116.

If the user accepts the current version of the bookmarked web page, then the process goes back to step 106. The new version of the bookmarked web page is then stored as first occurrence version and old version may be deleted.

If the user keeps the old version of the bookmarked web page, then the old version of the bookmarked web page, or its URL, is downloaded, e.g., for display or storage, to user's machine at step 118 and the process goes on to step 106.

In the present example, steps 102 to 106 constitute the first occurrence and steps 108 to 118 constitute the second occurrence in the method according to the invention.

When several users have bookmarked the same web page with the same first occurrence version of this web page, i.e., the same old version, then the UID for each of the several users is stored in association with the first occurrence version (old version) of the web page. In this case, the old version of the web page will be definitely deleted after there is no UID anymore associated with this version, i.e., after the web page has changed and a second occurrence have been executed for each of the several users, and step 116 or 118 have been executed for each of these several users.

With this intention, the method according to the invention keeps track of the UID of each user and first occurrence version of the bookmarked web page for each user. In the present example this is achieved by storing, for each user, the UID in association with the version of the web page that was active when first occurrence was executed for this user. These UID-version information is stored in a UID table as represented schematically in FIG. 2.

Figure 2:
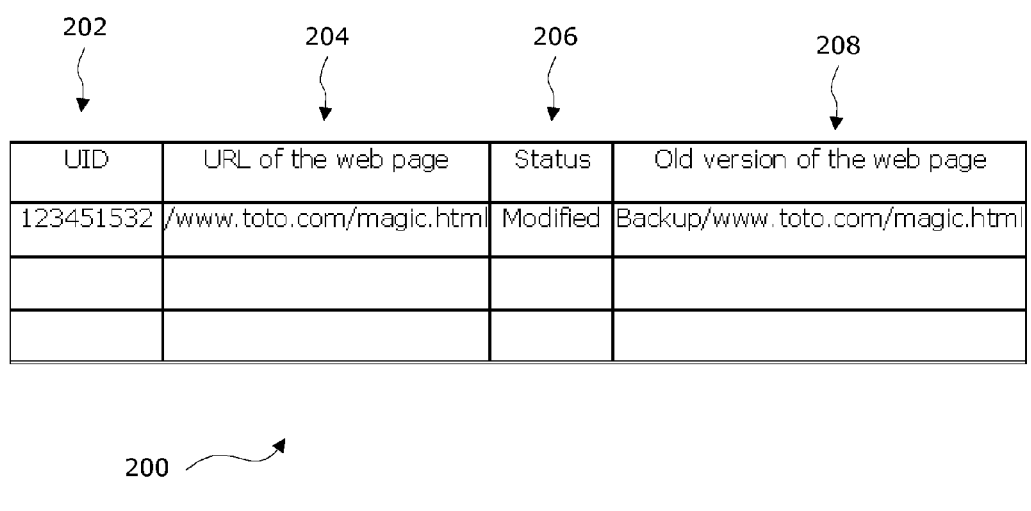
FIG. 2 schematically illustrates a user identification data table used according to the invention.

The UID table 200 represented in FIG. 2 comprise a first column 202 where each user's UID is noted. The column 204 comprises the URL of the first occurrence version of the bookmarked web page, the column 206 comprises the status of this web page for this user, and the column 208 comprise the URL of the backup where the first occurrence version of the web page is stored if the web page has changed for this user. The UID table corresponds to a given bookmarked web page and each line represents a user. When an old version of the web page doesn't appear anymore in the column 208 for any user then it is definitely deleted.

Figure 3:
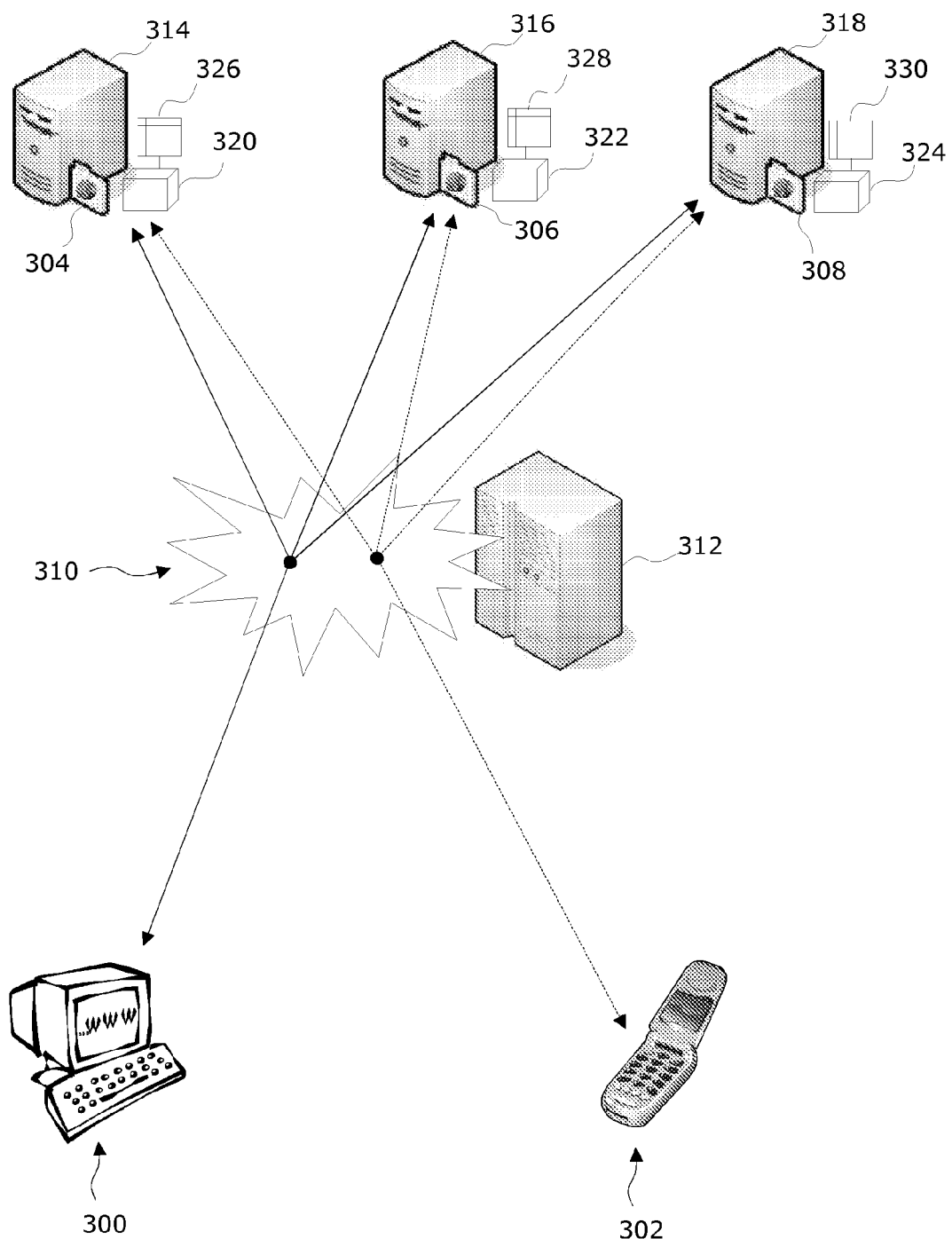
FIG. 3 schematically illustrates a first embodiment of the system according to the invention.

FIG. 3 is a schematic representation of a first embodiment of a system according to the invention. In this embodiment users 300 and 302 access web pages 304, 306 and 308 through a network 310 which is typically the Internet via a ISP server 312 provided by an Internet service provider (ISP). Each of the web pages 304-308 are provided by networks servers 314-318, typically web servers. Each of the network servers 314-318 comprise a "favorite update probe" (FUP) software 320-324 carrying out the server side monitoring of its web page. Each FUP 320-324 includes and maintains a UID table 326-330 where the identification data of the bookmarking users 300 and 302 are stored. The browsers of the users 300 and 302 communicate directly with the FUPs 320-324 for the monitoring of the web pages 304-308. For each web page 304-308 the following operations are realized. For more clarity we will describe the operations with respect to web page 304.

On bookmarking of the web page 304 an "inform update request" is sent by the browser of each user 300, 302 to a specific port of the network server 314 for a "favorite update process". These requests comprise the UID of their respective sending users.

The UID of each user 300, 302 is stored by the FUP 320 in a corresponding UID table 326. If the UID of a user already exists the FUP signals it to this user. The FUP 320 locks the page 304 in "read only".

If any process tries to access the bookmarked "read-only" page 304, e.g., for modifying or deleting it, the FUP provides the access while storing or backing up temporarily the previous version of the page 304. The FUP then updates the corresponding UID table with the URL of the stored version or of the backup. After such access, the FUP will control if the web page 304 has been changed, i.e., modified or deleted. A change information is stored in the corresponding UID table 326, e.g., in column 206, for all the users 300 and 302 who have bookmarked this web page. When the browser of the user 300 or 302 is launched next time, it polls, by a request, the FUP 320 to be informed of any change about the web page 304. This polling may apply systematically to all or part of the bookmarked web pages.

The FUP 320 informs the user's browser that the page 304 has been modified or deleted, so that this could retrieve the old version of the this web page or ignore the modification and accept the new version.

While the operations have been listed only for the web page 304, same operations are realized for pages 306 and 308 with corresponding FUPs 322 and 324 and UID tables 328 and 330. In this first embodiment the browsers of the users 300 and 302 communicate directly with the FUP of each web site or pages 304-308.

Figure 4:
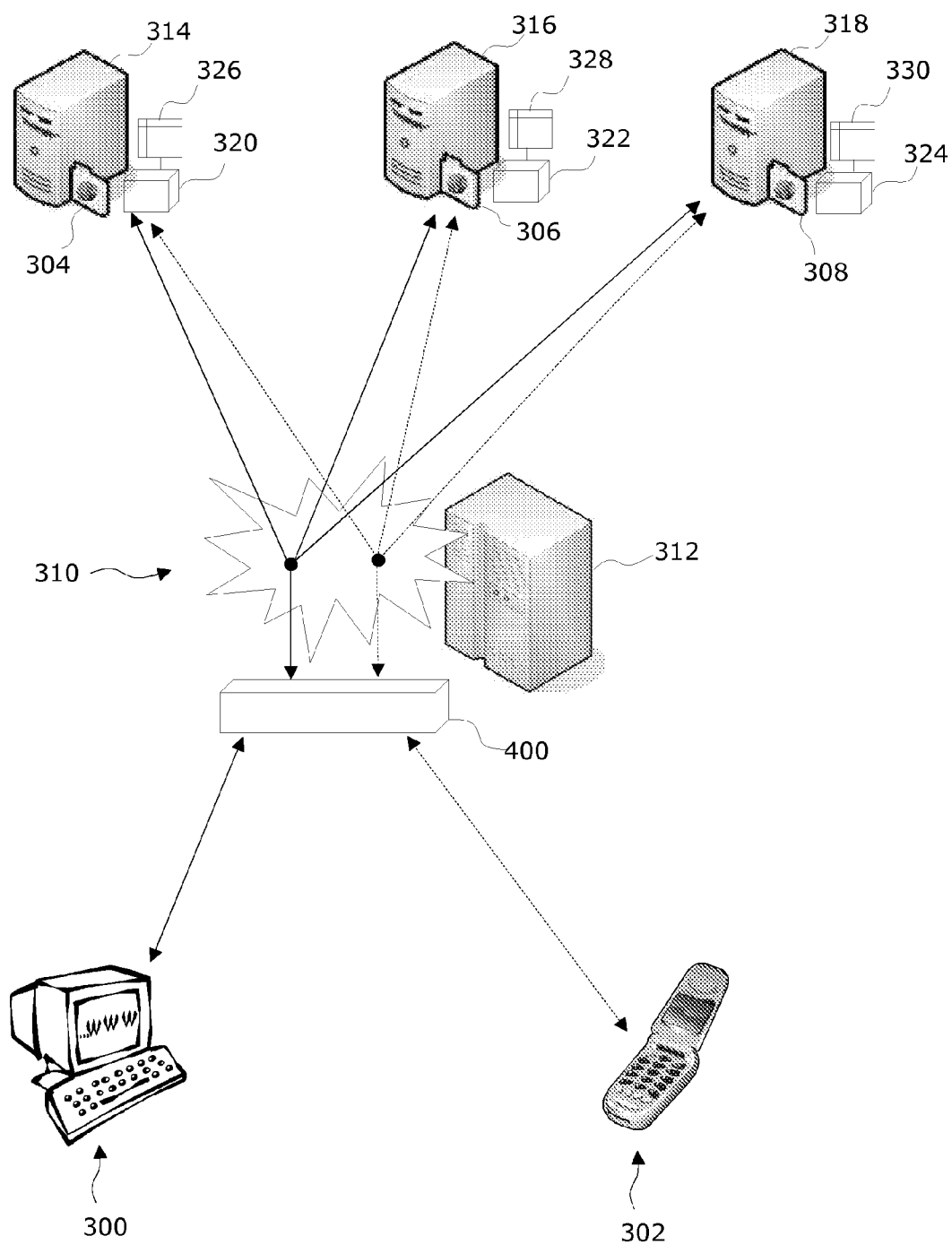
FIG. 4 schematically illustrates a second embodiment of the system according to the invention.

FIG. 4 gives schematic representation of a second embodiment of the system according to the invention. In this embodiment, the ISP server comprises a FUP 400 here called proxy-FUP. The browsers of the users 300 and 302 communicate with the proxy FUP 400. The proxy FUP 400 communicates with FUPs 320-324 associated with the web pages 304-308.

In the list above, first, second and sixth operations are realized between the browsers of the users 300, 302 and the proxy-FUP 400, while the third and fifth operations are realized between the proxy-FUP 400 and the FUPs 320-324 corresponding to the respective web pages 304-308.

Whatever the embodiment it is the browser of the user who polls the FUP or the proxy FUP for change information within the web pages 304-308.

While the invention has been particularly shown and described mainly with reference to a preferred embodiment, it will be understood that various changes in form and detail may be made therein without departing from the spirit, and scope of the invention.

The invention claimed is:

1. A method for monitoring a web page bookmarked by a user of a browser, comprising:
   in a first occurrence:
      sending, from the browser to at least one remote network server, user identification data for uniquely identifying the user of the browser; and
      storing by the remote server the user identification data in association with the bookmarked web page in a storage means; and in a future occurrence, at least one iteration of:
      sending, from the browser of the user to the remote network server, a request for change information about the bookmarked web page,
      sending, from the remote server to the browser of the user, change information about the web page, and
   in response to a change within the bookmarked web page since first occurrence:
      selecting an operation among the following list:
         downloading the first occurrence version of the bookmarked web page;
         downloading the uniform resource locator (URL) of the bookmarked web page, in case of a change of the URL of the web page;
         downloading the URL of the first occurrence version of the bookmarked web page; and
         accepting the current version of the bookmarked web page.

2. The method according to claim 1, wherein the first occurrence further comprises:
   storing the first occurrence version of the bookmarked version of the web page in storage means.

3. The method according to claim 1, wherein, in case of change within the first occurrence version, a second occurrence further comprises:
   sending a request for downloading the stored first occurrence version of the bookmarked page.

4. The method according to claim 3, wherein the second occurrence further comprises:
   downloading, directly or indirectly, the first occurrence version of the bookmarked web page from the storage means.

5. The method according to anyone of claim 1, wherein the second occurrence further comprises:
   deleting the first occurrence version of the bookmarked web page, after the selected operation is executed.

6. The method according to claim 1, wherein the remote network server is a server associated with the bookmarked web page.

7. The method according to claim 1, wherein the remote network server carries out the method for a plurality of web servers.

8. The method according to claim 1, wherein the first occurrence is executed automatically when the user bookmarks the web page.

9. The method according to claim 1, wherein the second occurrence is executed every time the user launches the browser or displays the bookmarked web page.

10. The method according to claim 1, wherein the second occurrence is executed at a predetermined frequency.

11. The method according to claim 1, wherein the change information about the bookmarked web page comprises at least one of:
information related to the uniform resource locator (URL) of the web page, and
information related to the content of the bookmarked page.

12. The method according to claim 1, for monitoring the web page for several users.

13. The method according to claim 12, wherein the identification data storing further comprises:
storing, for at least one bookmarked web page, the identification data for each user bookmarking the web page in a table associated with the bookmarked web page.

14. The method according to claim 13, further comprising, in a case of several users having bookmarked the web page with same first occurrence version:
in the first occurrence, storing the first occurrence version of the bookmarked web page in association with user identification data of each of the several users; and
after second occurrence, deleting the stored bookmarked web page if the second occurrence has been executed for each of the several users and there is a change within the web page since first occurrence.

15. A system for performing a method for monitoring a web page bookmarked by a user of a browser, the method comprising:
in a first occurrence:
sending, from the browser to at least one remote network server, user identification data for uniquely identifying the user of the browser; and
storing by the remote server the user identification data in association with the bookmarked web page in a storage means; and in a future occurrence, for at least one iteration:
sending, from the browser of the user to the remote network server, a request for change information about the bookmarked web page;
sending, from the remote server to the browser of the user, change information about the web page, and
in response to a change within the bookmarked web page since first occurrence:
selecting an operation among the following list:
downloading the first occurrence version of the bookmarked web page;
downloading the uniform resource locator (URL) of the bookmarked web page, in case of a change of the URL of the web page;
downloading the URL of the first occurrence version of the bookmarked web page; and
accepting the current version of the bookmarked web page.

16. A computer program loaded on a computer readable medium, which when executed, monitors a web page bookmarked by a user in a browser, comprising program code for:
in a first occurrence:
sending, from the browser to at least one remote network server, user identification data for uniquely identifying the user of the browser; and
storing by the remote server the user identification data in association with the bookmarked web page in a storage means; and in a future occurrence, at least one iteration of:
sending, from the browser of the user to the remote network server, a request for change information about the bookmarked web page,
sending, from the remote server to the browser of the user, change information about the web page, and
in response to a change within the bookmarked web page since first occurrence:
selecting an operation among the following list:
downloading the first occurrence version of the bookmarked web page;
downloading the uniform resource locator (URL) of the bookmarked web page, in case of a change of the URL of the web page;
downloading the URL of the first occurrence version of the bookmarked web page; and
accepting the current version of the bookmarked web page.

* * * * *